United States Patent [19]

Khaladji et al.

[11] Patent Number: 4,942,697
[45] Date of Patent: Jul. 24, 1990

[54] RARE EARTH POLISHING COMPOSITIONS

[75] Inventors: Jean Khaladji, Paris; Marcel Peltier, La Rochelle, both of France

[73] Assignee: Rhone-Poulenc Industries, Paris, France

[21] Appl. No.: 65,633

[22] Filed: Jun. 25, 1987

Related U.S. Application Data

[60] Continuation of Ser. No. 707,139, Mar. 1, 1985, abandoned, which is a division of Ser. No. 218,792, Dec. 22, 1980, Pat. No. 4,529,410.

[30] Foreign Application Priority Data

Dec. 27, 1979 [FR] France .................................. 7931742

[51] Int. Cl.$^5$ ............................................. B24D 17/00
[52] U.S. Cl. .................................... 51/283 R; 51/307; 51/309; 423/263
[58] Field of Search ..................... 51/309, 307, 283 R; 423/263

[56] References Cited

U.S. PATENT DOCUMENTS

| | | | |
|---|---|---|---|
| 3,262,766 | 7/1966 | Nonamaker | 51/308 |
| 3,311,461 | 3/1967 | Silvernail | 51/309 |
| 3,768,989 | 10/1973 | Goetzinger et al. | 51/309 |

FOREIGN PATENT DOCUMENTS

| | | |
|---|---|---|
| 2145820 | 3/1972 | Fed. Rep. of Germany . |
| 10850 | 8/1960 | Japan . |
| 9746 | 6/1964 | Japan . |

OTHER PUBLICATIONS

Chemical Abstracts, vol. 80, 1974, 51688g.
Chemical Abstracts, vol. 93, 1980, 30807f.
Chemical Abstracts, vol. 82, 1975, 128702r.

*Primary Examiner*—James Derrington
*Attorney, Agent, or Firm*—Burns, Doane, Swecker & Mathis

[57] ABSTRACT

Rare earth glass-polishing compositions of improved homogeneity and reproducibility are prepared by (a) simultaneously continuously admixing a cerium salt solution, a basic solution and a solution of at least one acid and/or one salt, the anion or anions of which being adopted to form insoluble rare earth compounds, the number of equivalents of base being equal to or greater than the number of equivalents of cerium, and the pH of the reaction medium being greater than about 6; (b) filtering the precipitate which results from the reaction medium; (c) drying said recovered precipitate; and (d) calcining said dried precipitate.

14 Claims, No Drawings

RARE EARTH POLISHING COMPOSITIONS

This application is a continuation of application Ser. No. 707,139, filed Mar. 1, 1985, abandoned, which is a divisional application of Ser. No. 218,792, filed Dec. 22, 1980, now U.S. Pat. No. 4,529,410.

BACKGROUND OF THE INVENTION

1. Field of the Invention:

The present invention relates to the preparation of improved polishing compositions, to the resultant compositions themselves, and to the use of such compositions for the polishing of glass or like materials. More especially, this invention relates to the continuous preparation of polishing compositions comprising the rare earths.

2. Description of the Prior Art:

Among the polishing compositions currently used in the glass industry, those based upon the rare earths, and in particular cerium, typically perform the best. A variety of processes for the manufacture or preparation of such compositions are also known to this art. Thus, it has been proposed, according to published French Patent Application No. 2,426,110, to precipitate an aqueous solution of the rare earth sulfates by means of sodium hydroxide, in the presence of molochite, and to filter off, wash, dry and calcine the resulting product in order to obtain the desired polishing composition. A process of this type, though, is incapable of providing wholly satisfactory polishing compositions from a total effectiveness standpoint, in particular because of the heterogeneity, the undefined structure and the irreproducibility of the resultant compositions. These disadvantages notably arise from the conditions under which the process is carried out, and according to which conditions the concentration of the reactants changes during the reaction and it is thus impossible to repeatedly prepare any given composition in a completely reproducible manner; such disadvantages also ensue by reason of the existence of foreign compounds (molochite) and the presence of sulfates, the precipitation of which by means of sodium hydroxide giving rise to complex mixtures of products, such as double sulfates, hydroxysulfates and hydroxides, the amount and nature of which can vary during the reaction.

It has also been proposed [Chemical Abstracts, 80, 51688, (1974)] to prepare cerium-based polishing compositions by precipitating ceric hydroxide, by means of ammonia, from a rare earth nitrate solution in which the cerium has been preliminarily oxidized. A process of this type requires an additional purification step entailing recrystallization via cerium/ammonium nitrate, and recovering the calcined oxide by means of a dilute acid; the resultant compositions are inadequate from an effective polishing point of view. Furthermore, such compositions also do not possess satisfactory properties of homogeneity, structure and reproducibility.

SUMMARY OF THE INVENTION

Accordingly, a major object of the present invention is the provision of an improved process for the preparation of improved polishing compositions, which improved polishing compositions are not only directly usable, but which are markedly more effective and possess markedly improved properties vis-a-vis those prior art compositions above characterized.

Briefly according to this invention, the subject improved polishing compositions are prepared by:

(a) Simultaneously continuously admixing a cerium salt solution, a basic solution and a solution of at least one acid and/or one salt, the anion or anions of which being adopted to form insoluble rare earth compounds, the number of equivalents of base admixed being greater than or equal to the number of equivalents of cerium, and with the pH of the reaction medium being maintained at more than about 6;

(b) Filtering the resultant precipitate from the reaction medium;

(c) Drying said filtered precipitate; and (d) Calcining said dried precipitate.

DETAILED DESCRIPTION OF THE INVENTION

More particularly according to this invention, by reason of the simultaneous continuous admixing, the precipitate-forming reaction proceeds instantaneously and there is continuously in existence a very well-defined concentration of the various species within and throughout the reaction mass; such enables preparation of well-defined homogeneous compositions having stable characteristics and properties.

The temperature of the reaction medium is preferably between about 10° and 95° C. and more preferably between 50° and 70° C.

The residence time of the admixture in the reaction medium is not a critical factor according to the invention, and can vary over wide limits; in general, residence times of between about 30 minutes and 2 hours will be used.

The cerium salt solution used in accordance with the process of the invention can be any aqueous solution of a cerium salt, in either cerous and/or ceric state, but which is soluble under the reaction conditions of the invention, and, in particular, there is advantageously employed a solution of cerous chloride, or of cerium nitrate in the cerous or ceric state, or of a mixture of both.

The purity of the cerium salt utilized is immaterial; however, it can be advantageous to use a cerium salt having a degree of purity of more than 99%.

The concentration of the cerium salt solution is also not a critical factor according to the invention; it too can vary over wide limits; a concentration of between 0.5 and 2 mols per liter is preferred.

In a preferred embodiment of the invention, the cerium is introduced into the reaction medium in the cerous state and it is first oxidized to the ceric state by continuously adding to the reaction mixture, either alone or in admixture with a solution other than that containing the base, an oxidizing agent which is compatible with this medium. Suitable oxidizing agents which are exemplary include, in particular, solutions of perchlorate, chlorate, hypochlorite, persulfate or hydrogen peroxide, or air, oxygen or ozone. The cerium can also be oxidized by an electrochemical process. Hydrogen peroxide is preferably used.

The proportion of oxidizing agent, relative to the cerous salt to be oxidized, can also vary over wide limits. It is typically greater than the stoichiometric amount, and preferably is a stoichiometric excess of between 10 and 40%.

The basic solution employed in the process of the invention can be, in particular, an aqueous solution of ammonia, sodium hydroxide, potassium hydroxide or sodium carbonate. According to the invention, an ammonia solution is preferably used. The normality of the basic solution used is not a critical factor according to the invention; it can vary over wide limits but will advantageously be between 1 and 5 N.

The relative proportions of the basic solution and the cerium salt solution must be such that the number of equivalents of base introduced is greater than or equal to the number of equivalents of cerium introduced in the same stage. It can be advantageous to use an excess of more than about 5% of equivalents of base, relative to the equivalents of cerium. The pH of the reaction medium, which must be more than about 6, must not however exceed about 10. It is advantageously between 7 and 9. It can be particularly advantageous to adjust the pH, within these limits, to a value which is constant to within ±0.1 of a pH unit.

The solution of the at least one acid and/or one salt, the anion or anions of which being capable of forming insoluble rare earth compounds according to the invention, can be, in particular, any aqueous solution of an acid and/or a salt, the anion of which being selected from the group comprising at least one of the following anions: oxalate, fluoride, carbonate, borate, silicate, sulfate and phosphate. The salt or salts used are the water-soluble salts and preferably the ammonium, sodium and potassium salts. This solution is introduced into the reaction medium either alone or admixed with the basic solution.

Preferably, such salts are those in which the anion is a fluoride, a sulfate, a borate or a phosphate anion.

The concentration of the solution of acid and/or salt is also not a critical factor according to the invention and it too can vary over wide limits; however, it is preferably less than 6 mols per liter and more preferably between 2 and 4 mols per liter.

In accordance with another embodiment of the invention, it is also possible to continuously add to the reaction mixture, either alone or admixed with the cerium salt solution, an aqueous solution of a salt of at least one trivalent rare earth, which salt optionally contains yttrium and is soluble under the reaction conditions consistent herewith. Suitable salts which are exemplary include, in particular, the chlorides or the nitrates of lanthanum, praseodymium, neodymium, samarium, europium, gadolinium, terbium, dysprosium, holmium, erbium, thulium, ytterbium, lutetium and yttrium. In particular, it is possible to use a solution which contains the cerium salt and rare earth salts, and which originates directly or indirectly from the treatment of rare earth ores.

The concentration of the solution of rare earth salt(s) consistent with this embodiment of the invention is again not a critical factor and it can vary over wide limits; however, it is preferably between 0.2 and 1 mol per liter.

In the process of the invention, the number of equivalents of anion used is greater than or equal to the number of equivalents of cation used; however, it must not lead to the formation of compounds adsorbed onto the composition obtained by mixing the reactants.

In accordance with yet another embodiment of the invention, the reaction mass can be aged for a certain period of time at a temperature between about 10° and 95° C., and preferably between 50° and 80° C., before the filtration operation. In this case, the aging time is also not a critical factor according to the invention and too can vary over wide limits; however, a time which can range up to about 2 hours is generally satisfactory In accordance herewith, the reaction mass, which is in the form of a suspension, is filtered after the reaction. This filtration operation is optionally carried out continuously, at a temperature between about 10° and 90° C. and preferably between 35° and 45° C.

Per another embodiment of the invention, the filter cake can then be washed with water or a solution of an ammonium salt. After this washing, the water content of the filter cake is between about 20 and 80% by weight and generally between 30 and 50%.

The product obtained after filtration and, if appropriate, washing, is then dried, optionally by a continuous process. The drying temperature is preferably between 100° and 600° C., with the drying time preferably varying between 30° minutes and 2 hours under these conditions.

The dry product is then calcined, optionally by a continuous process, at a temperature between about 600° and 1,200° C. for a period of time which is generally between about 30 minutes and 10 hours.

The drying and calcination operations can be carried out in two separate apparatuses or can be carried out successively in a single apparatus.

The compositions obtained in accordance with the process of the invention can be used for the polishing of glass or like materials, optionally after grinding and particle size selection utilizing those techniques which are well known to this art.

The polishing compositions of the invention prove to exhibit numerous advantages, compared with the known products. Thus, apart from the improved properties of homogeneity, reproducibility of characteristics and nature of the products, the subject compositions have an improved appearance with improved properties with regard to density and suspension stability, and improved performances with regard to polishing effectiveness, polishing speed, low rate of rejection of the polished articles, and the like.

In order to further illustrate the present invention and the advantages thereof, the following specific examples are given, it being understood that same are intended only as illustrative and in nowise limitative.

In said examples which follow, the resultant products were prepared in equipment comprising the following components:

(i) A stirred and temperature-controlled 1.2 liter reactor;
(ii) A pH regulation unit connected to the reactor outlet, which measures the pH in the reactor and adjusts same by altering the flow rate of the basic aqueous solution;
(iii) A stirred and temperature-controlled 1.2 liter "aging" vessel;
(iv) A battery of Buchner-type filters; and
(v) A rotary furnace for drying and calcination.

The characteristics and properties of the final products were determined by the following methods:

(1) Particle size: sieving through a metal sieve under a stream of water, the powder having been preliminarily disintegrated by means of ultrasound for two five-minute periods, in aqueous suspension.

(2) Bulk tap density: Standardized method DIN 53,194.

(3) Suspension stability:

A suspension containing 50 g/liter is permitted to separate in a 250 ml cylinder (diameter: 38 mm) in which a densimeter is immersed. The density of the suspension at the level of the bulk is measured, with time, while the powder separates out. The $T_{50}$ is the time after which the measured value is the average of the initial density and the final density of the clear liquor.

(4) Polishing effectiveness:
Measuring apparatus, DIN Standard Specification 58,750.
  Colorless optical crown glass.
  Polisher: rilsan Hyprez "Lan-Plan"-$\phi$=94 mm
  Pressure: 665 g/cm$^3$
  Speed of rotation of the polisher: 100 rpm
  Concentration of the suspension: 125 g/liter
  Temperature of the suspension: 25° C.

(5) Crystal structure:
Debye-Scherrer method in transmission; monochromatic molybdenum radiation.

EXAMPLE 1

(a) The following ingredients were simultaneously continuously introduced into the reactor:
  (i) An aqueous solution containing 1 mol/liter of cerous nitrate; and
  (ii) A 2 ammonia solution, also containing 0.05 mol of ammonium sulfate per liter and 0.05 mol of ammonium fluoride per liter.

The rates of flow of these two solutions were such that the pH regulating device controlled the pH at 8.9±0.1.

The reactor was operated at a temperature of 25° C. and the aging vessel at 75° C.; the residence time in each apparatus was 1 hour.

(b) The resulting precipitate was filtered and then washed with water;
(c) It was next dried; and
(d) It was then calcined for 3 hours at 840° C.

After grinding and selection, a polishing composition having the following characteristics and properties was obtained:

(1) Particle size: less than 0.1% would not pass through a 15μm sieve;
(2) Color: ivory white;
(3) Bulk tap density: 1.8;
(4) Suspension stability $T_{50}$=1.4 minutes;
(5) Polishing effectiveness: 27 mg/dm$^2$/minute;
(6) Structure: dominant F cubic.
(7) Composition:
CeO$_2$: 99%
F$^-$: 1%
SO$_4^=$: <0.1%

EXAMPLE 2

(a) The following ingredients were simultaneously continuously introduced into the reactor:
  (i) An aqueous solution containing 1 mol of ceric nitrate per liter and 0.6 mol of free nitric acid per liter; and
  (ii) A 3 N ammonia solution, also containing 0.10 mol of ammonium fluoride per liter and 0.05 mol of ammonium sulfate per liter.

The rates of flow of these two solutions were such that the pH regulating device controlled the pH at 7.5±0.1.

The reactor was operated at a temperature of 50° C. and the aging vessel at 80° C.; the residence time in each apparatus was 1 hour.

(b) The resulting precipitate was filtered off and then washed with water;
(c) It was next dried; and
(d) It was then calcined for 1 hour at 1,000° C.

After grinding and selection, a polishing composition having the following characteristics and properties was obtained:

(1) Particle size: less than 0.1% would not pass through a 15μm sieve;
(2) Color: ivory white;
(3) Bulk tap density: 1.8;
(4) Suspension stability $T_{50}$=1.5 minutes;
(5) Polishing effectiveness: 25 mg/dm$^2$/minute;
(6) Structure: dominant F cubic.
Composition:
CeO$_2$: 98.5%
F$^-$: 1.5%
SO$_4^=$: <0.1%

EXAMPLE 3

(a) The following ingredients were simultaneously continuously introduced into the reactor:
  (i) An aqueous solution containing 1 mol of cerium nitrate per liter;
  (ii) A 6 N hydrogen peroxide solution;
  (iii) A 5 N ammonia solution;
  (iv) An aqueous solution containing 1 mol of ammonium fluoride per liter and 0.08 mol of trisodium phosphate per liter; and
  (v) An aqueous solution containing 1 mol of neodymium nitrate per liter.

The rates of flow of these solutions were such that the pH regulating device controlled the pH at 7±0.1 and such that the rate of flow of the neodymium nitrate solution was 34% of the rate of flow of the cerium nitrate solution.

The reactor was operated at a temperature of 50° C. and the aging vessel at 80° C.; the residence time in each apparatus was 1 hour.

(b) The resulting precipitate was filtered off and then washed with water;
(c) It was next dried; and
(d) It was then calcined for 1 hour at 850° C.

After grinding and selection, a polishing composition having the following characteristics and properties was obtained:

(1) Particle size: less than 0.1% would not pass through a 15μm sieve;
(2) Color: cream;
(3) Bulk tap density: 1.7;
(4) Suspension stability $T_{50}$ =2.7 minutes;
(5) Polishing effectiveness: 25 mg/dm$^2$/minute;
(6) Structure: crystallites of F cubic structure, linked by a phase of monazite-type structure.
(7) Composition:
Total Rare
Earth Oxides: 93%
CeO$_2$: 65%
Nd$_2$O$_3$: 28%
F$^-$: 8%
PO$_4^=$: 2.7% (expressed in P$_2$O$_5$)

EXAMPLE 4

The process was carried out under the same conditions as those described in Example 3, with only the duration and the temperature of calcination being varied.

In that case where the calcination was carried out for 30 minutes at 850° C., the polishing composition possessed the following characteristics and properties:
(1) Color: cream;
(2) Bulk tap density: 1.5;
(3) Suspension stability $T_{50} = 2.7$ minutes;
(4) Polishing effectiveness: 25 mg/dm$^2$/minute.

EXAMPLE 5

(a) The following ingredients were simultaneously continuously introduced into the reactor:
(i) An aqueous solution containing 0.45 mol of cerium nitrate per liter, 0.55 mol of neodymium nitrate per liter and 0.28 mol of hydrogen peroxide per liter; and
(ii) An aqueous solution containing 1.33 mols of ammonia per liter, 0.34 mol of ammonium fluoride per liter and 0.25 mol of trisodium phosphate per liter.

The rates of flow of these solutions were such that the pH regulating device controlled the pH at 7±0.1.

The reactor was operated at a temperature of 50° C and the aging vessel at 75° C.; the residence time in each apparatus was 1 hour.

(b) The resulting precipitate was filtered off and then washed with water;
(c) It was next dried; and
(d) It was then calcined for 1 hour at 800° C.

A polishing composition having the following characteristics and properties was obtained:
(2) Bulk tap density: 1.55;
(3) Suspension stability $T^{50} = 3.7$ minutes;
(4) Polishing effectiveness: 23 mg/dm$^2$/minute;
(5) Structure: crystallites of F cubic structure, linked by a phase of monazite-type structure. An intermediate amorphous phase was visible.
(6) Composition:
Total Rare Earth Oxides: 84.4%
CeO$_2$: 38.5%
Nd$_2$O$_3$: 45.9%
F$^-$: 5.7%
PO$_4^=$: 1%

EXAMPLE 6

(a) The following ingredients were simultaneously continuously introduced into the reactor:
(i) An aqueous solution containing 0.35 mol of cerium chloride per liter, 0.25 mol of hydrogen peroxide per liter, 0.45 mol of lanthanum nitrate per liter and 0.20 mol of neodymium chloride per liter; and
(ii) An aqueous solution containing 1.12 mols of ammonia per liter, 0.29 mol of ammonium fluoride per liter and 0.21 mol of ammonium phosphate per liter.

The rates of flow of these solutions were such that the pH regulating device controlled the pH at 7.7±0.1.

The reactor was operated at a temperature of 50° C. and the aging vessel at 75° C.; the residence time in each apparatus was 1 hour.

(b) The resulting precipitate was filtered off and then washed with water;
(c) It was next dried; and
(d) It was then calcined for 2 hours at 950° C.

A polishing composition having the following characteristics and properties was obtained:
(1) Color: pale pink;
(2) Bulk tap density: 1.35;
(3) Polishing effectiveness: 23 mg/dm$^2$/minute.
(4) Composition:
Total Rare Earth Oxides: 85%
CeO$_2$: 30.5%
Nd$_2$O$_3$: 45.9%
La$_2$O$_3$: 37.5%
F$^-$: 4.3%
PO$_4^=$: 12.5%

EXAMPLE 7

(a) The following ingredients were simultaneously continuously introduced into the reactor:
(i) An aqueous solution containing 0.75 mol of cerium nitrate per liter, 0.41 mol of hydrogen peroxide per liter and 0.25 mol of neodymium nitrate per liter;
(ii) An aqueous solution containing 2.3 mols of ammonia per liter and 0.5 mol of ammonium fluoborate per liter.

The rates of flow of these solutions were such that the pH regulating device controlled the pH at 7±0.1.

The reactor was operated at a temperature of 50° C. and the aging vessel at 75° C.; the residence time in each apparatus was 1 hour.

(b) The resulting precipitate was filtered off and then washed with water;
(c) It was next dried; and
(d) It was then calcined for 2 hours at 950° C.

After grinding and selection, a polishing composition having the following characteristics and properties was obtained:
(1) Particle size: less than 0.1% would not pass through a 15μm sieve;
(2) Color: buff;
(3) Bulk tap density: 1.8;
(4) Suspension stability $T^{50}$: 2 minutes;
(5) Polishing effectiveness: 24 mg/dm$^2$/minute;
(6) Structure: crystallites of F cubic structure, linked by an amorphous phase.
(7) Composition:
Total Rare Earth Oxides: 95%
CeO$_2$: 71.5%
Nd$_2$O$_3$: 23.5%
F$^-$: 4%
B$_2$O$_3$: 1%

EXAMPLE 8

(a) The following ingredients were simultaneously continuously introduced into the reactor:
(i) An aqueous solution containing 0.5 mol of cerium chloride per liter, 0.28 mol of hydrogen peroxide per liter, 0.25 mol of lanthanum chloride per liter, 0.20 mol of neodymium chloride per liter and 0.05 mol of praseodymium chloride per liter;
(ii) An aqueous solution containing 0.72 mol of ammonium fluoride per liter and 0.53 mol of ammonium phosphate per liter; and
(iii) A 2.5 N ammonia solution.

The rates of flow of these solutions were such that the pH regulating device controlled the pH at 7±0.1.

The reactor was operated at a temperature of 50° C. and the aging vessel at 75° C.; the residence time in each apparatus was 1 hour.

(b) The resulting precipitate was filtered off and then washed with water;
(c) It was next dried; and
(d) It was then calcined for 1 hour at 900° C.

After grinding and selection, a polishing composition having the following characteristics and properties was obtained:

(1) Particle size: less than 0.1% would not pass through a 15μm sieve;
(2) Color: pale pink;
(3) Bulk tap density: 1.55;
(4) Suspension stability $T_{50}$: 2.7 minutes;
(5) Polishing effectiveness: 23 mg/dm$^2$/minute;
(6) Structure: crystallites of F cubic structure, linked by a phase of monazite-type structure.
(7) Composition:
Total Rare Earth Oxides: 83.2%
$CeO_2$: 42.5%
$Nd_2O_3$: 16.5%
$La_2O_3$: 20.0%
$Pr_2O_3$: 4.2%
$F^-$: 5.6%
$PO_4^=$: 14%

EXAMPLE 9

The process was carried out under the same conditions as those described in Example 8, with the only difference being that the pH regulating device was set at different values:

(I) pH set at 6.5±0.1:
The characteristics and properties of the polishing composition obtained were as follows:
(1) Particle size: less than 0.1% would not pass through a 15μm sieve;
(2) Color: pale pink;
(3) Bulk tap density: 1.3;
(4) Polishing effectiveness: 25 mg/dm$^2$/minute;
(5) Structure: identical to that of the composition obtained in Example 8.

(II) pH set at 7.8±0.1:
The characteristics and properties of the polishing composition obtained were as follows:
(1) Particle size: less than 0.1% would not pass through a 15μm sieve;
(2) Color: pale pink;
(3) Bulk tap density: 1.35;
(4) Polishing effectiveness: 25 mg/dm$^2$/minute;
(5) Structure: identical to that of the composition obtained in Example 8.

(III) pH set at 5.6±0.1:
The characteristics and properties of the polishing composition obtained were as follows:
(1) Particle size: less than 0.1% would not pass through a 15μm sieve;
(2) Color: pale pink;
(3) Bulk tap density: 1.7;
(4) Polishing effectiveness: 20 mg/dm$^2$/minute;
(5) Structure: identical to that of the compound obtained in Example 8, but with a less abundant monazite phase.

EXAMPLE 10

(a) The following ingredients were simultaneously continuously introduced into the reactor:
  (i) An aqueous solution containing 1.4 mols of cerium chloride per liter;
  (ii) A 6 N hydrogen peroxide solution;
  (iii) An aqueous solution containing 0.6 mol of lanthanum chloride per liter;
  (iv) An aqueous solution containing 2.15 mols of ammonium fluoride per liter and 0.35 mol of ammonium phosphate per liter; and
  (v) A 2.4 N ammonia solution.

The rates of flow of these solutions was such that the pH regulating device controlled the pH at 7.7±0.1.

The reactor was operated at a temperature of 50° C. and the aging vessel at 75° C.; the residence time in each apparatus was 1 hour.

(b) The resulting precipitate was filtered off and then washed;
(c) It was next dried; and
(d) It was then calcined for 1 hour at 975° C.

After grinding and selection, a polishing composition having the following characteristics and properties was obtained:
(1) Particle size: less than 0.1% would not pass through a 15μm sieve;
(2) Color: light cream;
(3) Bulk tap density: 1.7;
(4) Polishing effectiveness: 27 mg/dm$^2$/minute;
(5) Structure: analogous to that of the product obtained in Example 3.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A rare earth polishing composition of reproducible homogeneity produced by a process comprising: (a) simultaneously continuously admixing a cerium salt solution, a basic solution, and a solution of at least one acid and/or one salt, the anion or anions of which being adopted to form insoluble rare earth compounds, the number of equivalents of base being equal to or greater than the number of equivalents of cerium, and the pH of the reaction medium being greater than about 6; (b) filtering the precipitate which results from the reaction medium; (c) drying said recovered precipitate; and (d) calcining said dried precipitate, wherein said calcined precipitate comprises a sulphur content of less than 0.1% by weight.

2. The composition defined by claim 1 wherein said solutions are aqueous solutions and further comprising grinding and particle size selecting the polishing composition which results after calcination.

3. The composition defined by claim 1 wherein said solutions are aqueous solutions and wherein the solution of at least one acid and/or salt, the anion or anions of which being adopted to form insoluble rare earth compounds, comprises oxalate.

4. The composition defined by claim 1 wherein said solutions are aqueous solutions and wherein the solution of at least one acid and/or salt, the anion or anions of which being adopted to form insoluble rare earth compounds, comprises carbonate.

5. The composition defined by claim 1 wherein said solutions are aqueous solutions and wherein the solution of at least one acid and/or salt, the anion or anions of which being adopted to form insoluble rare earth compounds, comprises borate.

6. The composition defined by claim 1 wherein said solutions are aqueous solutions and wherein the solution of at least one acid and/or salt, the anion or anions of which being adopted to form insoluble rare earth compounds, comprises silicate.

7. The composition defined by claim 1 wherein said solutions are aqueous solutions and wherein the solution of at least one acid and/or salt, the anion or anions of which being adopted to form insoluble rare earth compounds, comprises sulfate.

8. The composition as defined by claim 1 wherein said calcination is carried out at a temperature between about 600° C. and 1,200° C. for from about 30 minutes to 10 hours.

9. A rare earth polishing composition of reproducible homogeneity produced by a process comprising: (a) simultaneously continuously admixing a cerium salt solution, a basic solution and a solution of at least one acid and/or one salt, the anion or anions of which being adopted to form insoluble rare earth compounds and comprising fluoride, the number of equivalents of base being equal to or greater than the number of equivalents of cerium, and the pH of the reaction medium being greater than about 6; (b) filtering the precipitate which results from the reaction medium; (c) drying said recovered precipitate; and (d) calcining said dried precipitate to thereby obtain a composition containing fluoride anions and having a sulphur content of less than 0.1% by weight.

10. A rare earth polishing composition of reproducible homogeneity produced by a process comprising: (a) simultaneously continuously admixing a cerium salt solution, a basic solution, and a solution of at least one acid and/or one salt, the anion or anions of which being adopted to form insoluble rare earth compounds and comprising phosphate, the number of equivalents of base being equal to or greater than the number of equivalents of cerium, and the pH of the reaction medium being greater than about 6; (b) filtering the precipitate which results from the reaction medium; (c) drying said recovered precipitate; and (d) calcining said dried precipitate to thereby obtain a composition containing phosphate anions and having a sulphur content of less than 0.1% by weight.

11. The composition defined by claim 9 wherein said obtained composition contains a content of fluoride anions in a range of from about 1 to about 11% by weight.

12. The composition defined by claim 10 wherein said obtained composition contains a content of phosphate anions in a range of from about 2.7 to about 14% by weight.

13. In the polishing of glass or like material, the improvement which comprises, utilizing as the polishing composition therefor, the rare earth polishing composition as defined by claim 1.

14. In the polishing of glass or like material, the improvement which comprises, utilizing as the polishing composition therefor, the rare earth polishing composition as defined by claim 2.

* * * * *